US009126533B2

(12) United States Patent
Kubota et al.

(10) Patent No.: US 9,126,533 B2
(45) Date of Patent: Sep. 8, 2015

(54) DRIVING SUPPORT METHOD AND DRIVING SUPPORT DEVICE

(75) Inventors: Tomoki Kubota, Okazaki (JP); Hidefumi Okabe, Okazaki (JP); Minoru Takagi, Okazaki (JP)

(73) Assignee: AISIN AW CO., LTD., Aichi (JP)

( * ) Notice: Subject to any disclaimer, the term of this patent is extended or adjusted under 35 U.S.C. 154(b) by 1892 days.

(21) Appl. No.: 12/068,685

(22) Filed: Feb. 11, 2008

(65) Prior Publication Data
US 2008/0204557 A1  Aug. 28, 2008

(30) Foreign Application Priority Data

Feb. 23, 2007 (JP) ................................. 2007-044403
Aug. 7, 2007 (JP) ................................. 2007-205671

(51) Int. Cl.
*H04N 7/18* (2006.01)
*G08G 1/017* (2006.01)
*B60R 1/00* (2006.01)

(52) U.S. Cl.
CPC *B60R 1/00* (2013.01); *H04N 7/183* (2013.01); *B60R 2300/105* (2013.01); *B60R 2300/202* (2013.01); *B60R 2300/205* (2013.01); *B60R 2300/301* (2013.01); *B60R 2300/302* (2013.01); *B60R 2300/306* (2013.01); *B60R 2300/602* (2013.01); *B60R 2300/70* (2013.01); *B60R 2300/802* (2013.01); *B60R 2300/8033* (2013.01)

(58) Field of Classification Search
CPC ................... B60R 2300/105; B60R 2300/202; B60R 2300/205; B60R 2300/301; B60R 2300/302; B60R 2300/306; B60R 2300/602; B60R 2300/70; B60R 2300/802; B60R 2300/8033; H04N 7/183
USPC .......................................... 348/148; 340/937
See application file for complete search history.

(56) References Cited

U.S. PATENT DOCUMENTS

| 5,734,807 | A  | * | 3/1998 | Sumi ............................. 345/427 |
| 7,520,616 | B2 | * | 4/2009 | Ooba et al. ...................... 353/13 |
| 2007/0072154 | A1 | * | 3/2007 | Akatsuka et al. ............... 434/69 |
| 2007/0081262 | A1 |   | 4/2007 | Oizumi et al. |

FOREIGN PATENT DOCUMENTS

| JP | 2005-125828 | 5/2005 |
| JP | 2005-184225 | 7/2005 |
| JP | 2006-044596 | 2/2006 |
| JP | 2006-290304 | 10/2006 |
| JP | 2007-104537 | 4/2007 |

* cited by examiner

*Primary Examiner* — Viet Vu
*Assistant Examiner* — Herman Belcher
(74) *Attorney, Agent, or Firm* — Bacon & Thomas, PLLC

(57) ABSTRACT

A driving support device uses a camera mounted on a vehicle for imaging a blind spot area created by a pillar of the vehicle and displays an image taken by the camera on the interior surface of the pillar. A virtual plane passing through boundaries of the blind spot area is set, and an image plane of the camera is set at a predetermined position where a non-displayed area or an excess area, created by deviation between the virtual plane and the image plane of the camera, is reduced. Image data input from the camera is subjected to coordinate transformation on the virtual plane, and an image corresponding to the blind spot area created by the pillar is displayed on the interior surface of the pillar, based on the image data subjected to coordinate transformation on the virtual plane.

6 Claims, 10 Drawing Sheets

F I G . 12
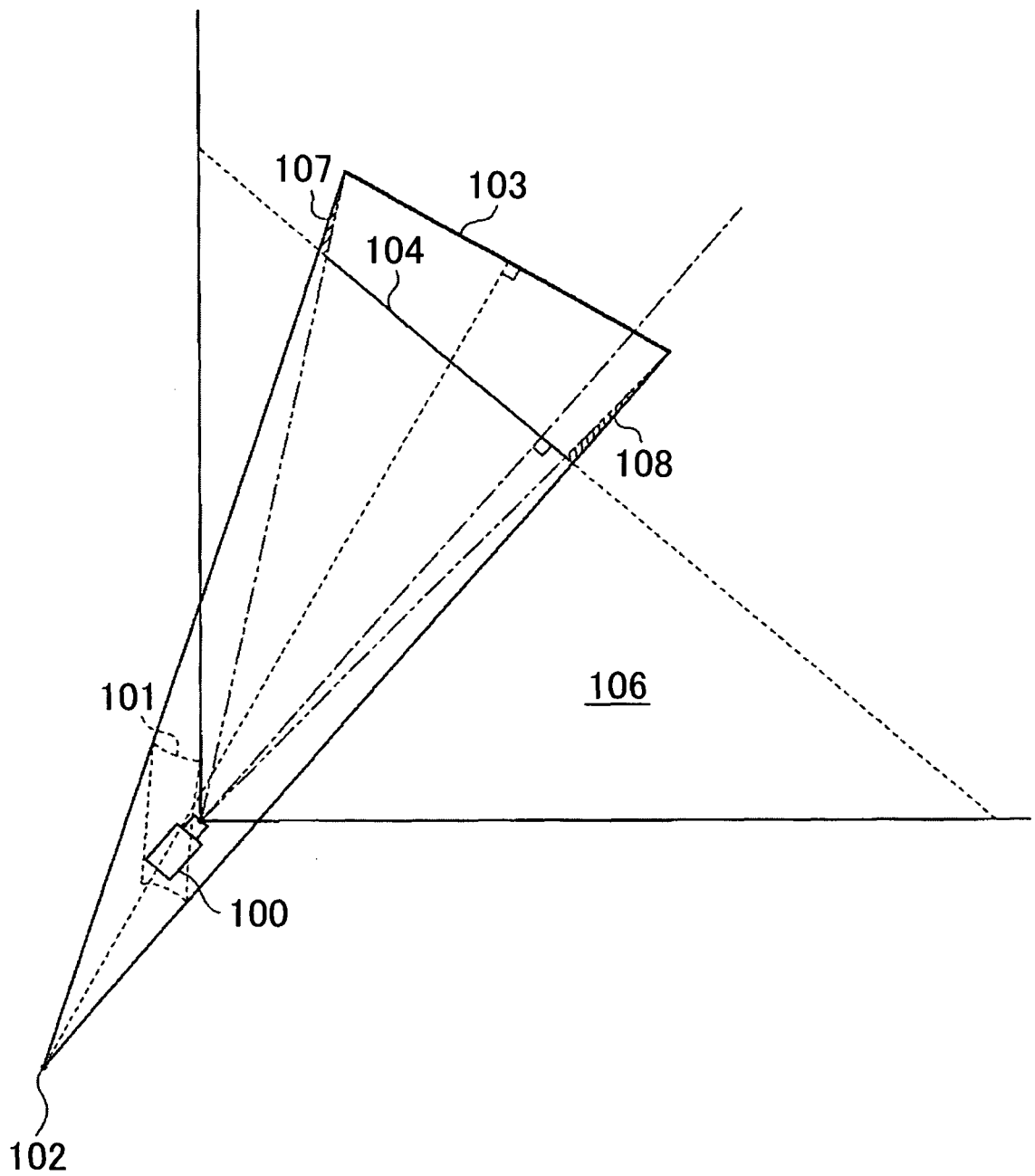

DRIVING SUPPORT METHOD AND DRIVING SUPPORT DEVICE

INCORPORATION BY REFERENCE

The disclosures of Japanese Patent Application No. 2007-205671 filed on Aug. 7, 2007 and Japanese Patent Application No. 2007-044403, filed Feb. 23, 2007, including their specifications, drawings and abstracts are incorporated herein by reference in their entirety.

BACKGROUND OF THE INVENTION

1. Field of the Invention

The present invention relates to a driving support method and a driving support device.

2. Description of the Related Art

Known conventional devices for supporting safe driving include onboard systems that use an onboard camera to take images of an area, namely, a driver's blind spot, and display the images. One such proposed system uses an onboard camera to take images of blind spot areas caused by a front pillar of a vehicle, and displays the captured images on an inner side of the front pillar. The front pillars are right and left supporting columns that support a front windshield and a roof. Thus, a front pillar is positioned in front and off to the side when viewed by a driver sitting in a driver seat. Although the front pillar partially obstructs the driver's field of view, it is essential for safety.

Referring to FIG. 12, the system described above includes a camera 100 that is attached to a vehicle body and capable of taking an image of an image area 106, an image processor that processes the image signals output from the camera 100, and a projector that projects an image on an inner side of a front pillar 101. Accordingly, as viewed from the driver's position 102, the outside background appears to be visible through the front pillar 101. Therefore, at intersections or the like, it is possible to check for obstacles and the shape of the road in a direction diagonally forward of the vehicle.

When an image captured by the camera 100 is projected on the pillar 101, however, the viewing angle of the camera 100 does not completely coincide with the viewing angle of the driver. Therefore, a problem arises in which the image projected on the pillar 101 is offset and askew with respect to the background as viewed by the driver through a window. As a countermeasure, Japanese Patent Application Publication No. JP-A-2005-184225 discloses projection transformation of an image taken by a camera onto a virtual plane (virtual screen plane) set to align with the driver's viewing angle.

SUMMARY OF THE INVENTION

However, to determine a focal point of the camera 100, as shown in FIG. 12 for example, an image plane 104 that corresponds to the focal point is set in front of a virtual plane 103. But regardless of how close the image plane 104 is set to the virtual plane 103, there will be areas 107, 108 that are not projected on the virtual plane 103 so long as the image plane 104 and the virtual plane 103 are separated. In addition, as FIG. 13 shows, setting the image plane 104 at a position farther away from the driver position 102 than the virtual plane 103 creates areas 109, 110 between the image plane 104 and the virtual plane 103 which are not projected onto the pillar.

The present invention offers a solution to the foregoing problems, and it is an object of the present invention to provide a driving support method and a driving support device (apparatus) for projecting onto the pillar an image that appears natural to the driver.

According to a first aspect of the invention, the image plane of the imaging device is set at a position that passes through an end point of the virtual plane. Therefore, it is possible to display a clear and natural image with high continuity that reduces the area not displayed, i.e. not projected onto the pillar, and reduces excess area in the captured image.

Because the driving support device sets the image plane of the imaging device at a position that passes through an end point of the virtual plane, it is possible to display a clear and natural image with high continuity that reduces the area not displayed, i.e. not projected onto the pillar and reduces excess area in the captured image.

According to another aspect of the invention, the image plane of the imaging device is set at a position closer to the vehicle than the virtual plane. Therefore, it is possible to display a clear and natural image with high continuity that does not include an excess area.

According to yet another aspect of the invention, the end point through which the image plane passes through is changed depending on the orientation of the optical axis of the imaging device and the orientation of a linear line linking the head position of the driver of the vehicle and the position of a depicted reference object. Therefore, the image plane can always be set in front of the virtual plane.

BRIEF DESCRIPTION OF THE DRAWINGS

FIG. 12 is an explanatory drawing of a conventional virtual plane camera image plane.

DETAILED DESCRIPTION OF THE PREFERRED EMBODIMENTS

Figure 1:
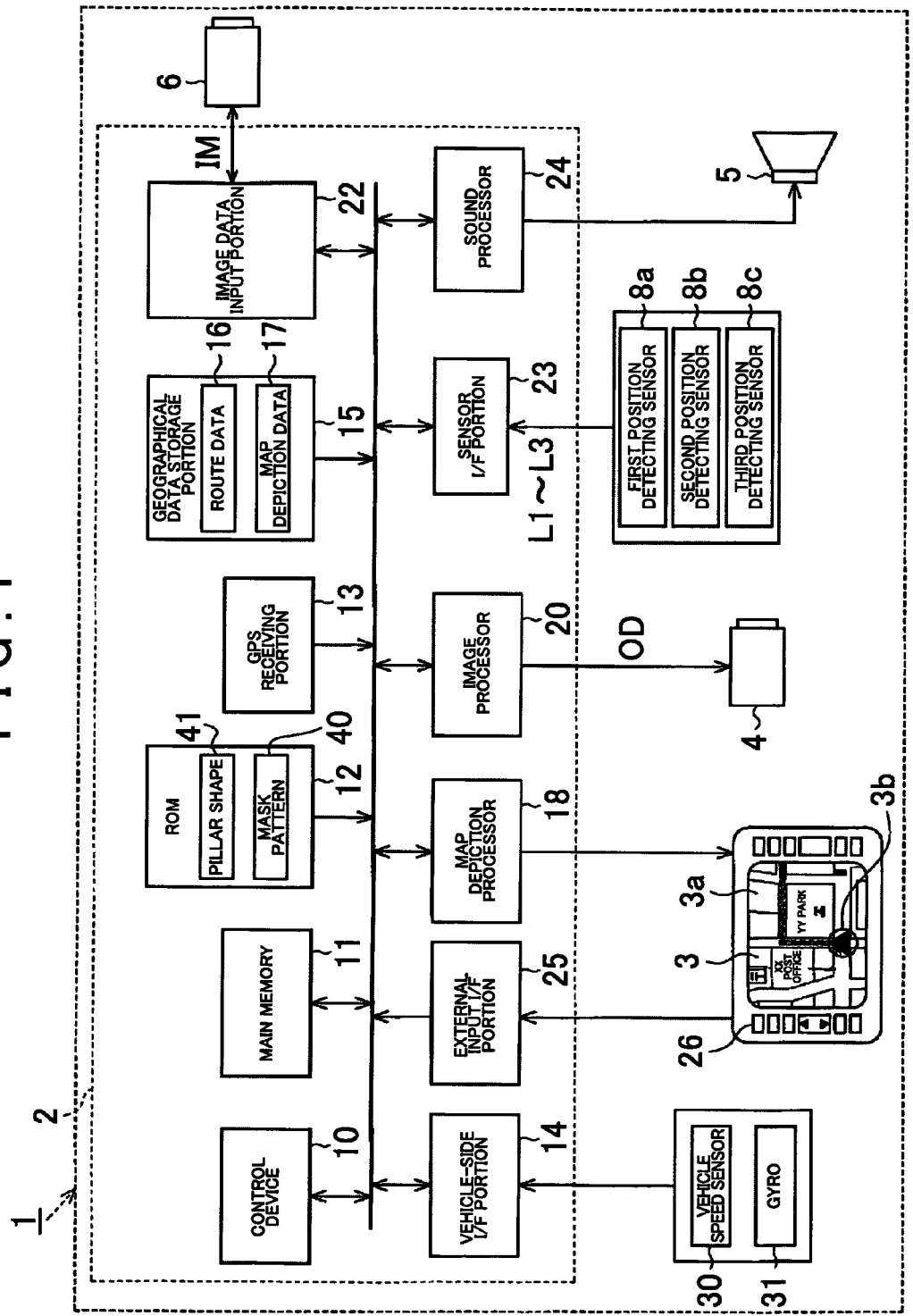
FIG. 1 is a block diagram of a driving support system according to an embodiment of the present invention.

Hereinafter, an embodiment of the apparatus (device) of the present invention will be described with reference to FIGS. 1 to 10. FIG. 1 is a block diagram of a driving support system 1 mounted in a vehicle C (see FIG. 3).

As shown in FIG. 1, the driving support system 1 includes a driving support unit 2 serving as a driving support device, a display 3, a projector 4 serving as a projection device, a speaker 5, a camera 6 serving as an imaging device, and first to third position detecting sensors 8a to 8c.

The driving support unit 2 includes a control portion 10, a nonvolatile main memory 11, a ROM 12, and a GPS receiving portion 13. The control portion 10 is a CPU, MPU, ASIC or the like, and provides overall control of various processes executed in accordance with a driving support program stored in the ROM 12. The main memory 11 temporarily stores results of the calculation from the control portion 10.

The control portion 10 obtains the satellite orbit information and time information received by the GPS receiving portion (receiver) 13 from a GPS satellite, and calculates an absolute location of the host vehicle based on electronic navigation. The control portion 10 receives inputs of a vehicle speed pulse and angular velocity, respectively from a vehicle speed sensor 30 and a gyro 31 provided in the vehicle C, via a vehicle-side I/F portion 14 of the driving support unit 2. The control portion 10 then calculates a relative position, i.e. relative to a reference position, based on autonomous navigation using the vehicle speed pulse and the angular velocity, and uses this in combination with the absolute position calculated by electronic navigation to identify the location of the host vehicle.

The driving support unit 2 also includes a geographical data storage unit or section 15. The geographical data storage unit 15 is an internal hard drive, or an external storage medium such as an optical disk. Stored in the geographical data storage unit 15 is route network data (hereinafter referred to as "route data") serving as map data for searching for a route to a destination, and map depiction data 17 serving as map data for outputting a map screen 3a on display 3.

The route data 16 is data pertaining to roads within grid sections covering the entire country. The route data 16 includes node data pertaining to nodes that serve as respective grid identifiers, intersections and road end points, and data such as link identifiers and link costs for links connected to the respective nodes. The control portion 10 uses such route data 16 to search for a recommended route to a destination and determines whether the vehicle C is approaching a guidance point such as an intersection.

The map depiction data 17 is data for depicting a road shape, background or the like, and is stored for each grid section, which together make up a map of the entire country. Stored in the map depiction data 17 is data pertaining to road markings such as center lines, white lines that define roadside zones, zebra zones and crosswalks, and installations on roads such as traffic signals. More specifically, types of road markings, position coordinates for road markings, types of road installations, coordinates of road installations and the like are stored in association with intersections and curves at respective points.

Referring to FIG. 1 again, the driving support unit 2 includes a map depiction processor 18. The map depiction processor 18 reads out map depiction data 17 for depicting a map of the vicinity of the vehicle C from the geographical data storage unit (portion) 15. The map depiction processor 18 then generates map output data, and displays the map screen 3a, based on the map output data, on the display 3. In addition, the map depiction processor 18 superimposes an indicator 3b for the host vehicle location on the map screen 3a.

In addition, the driving support unit 2 includes a sound processor 24. The sound processor 24 has a sound file (not shown) and outputs, for example, audio guidance for a route to the destination from a speaker 5. Furthermore, the driving support unit 2 includes an external input I/F portion 25 which receives an input signal generated by a user's operation of a touch panel type display 3 and/or a switch 26 adjacent the display 3, and based on that input signal, generates an output to the control portion 10.

Figure 2:
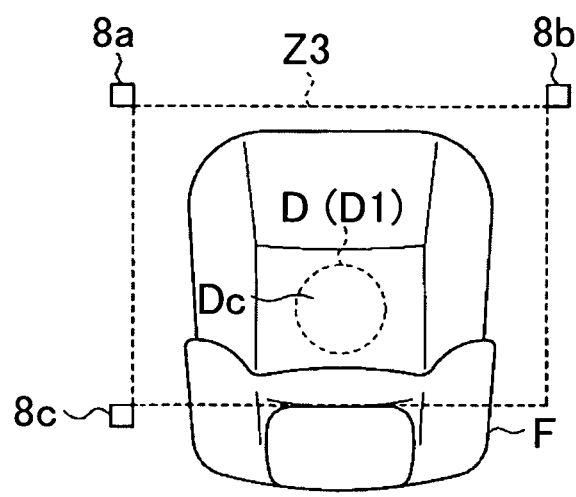
FIG. 2 is a drawing showing location of position sensors that detect the position of the head of a driver.

The driving support unit 2 also includes a sensor I/F portion 23 that serves as a detecting mechanism. The sensor I/F portion 23 receives signals from the first to third position detecting sensors 8a to 8c, e.g. ultrasonic sensors, which as shown in FIG. 2, are installed within a vehicle cabin around a front seat F. The first position detecting sensor 8a is installed near a rear view mirror (not shown), and is positioned at nearly the same height as the head D1 of the driver D, or otherwise at a somewhat higher position.

The second position detecting sensor 8b is attached above a door window W2 (see FIG. 3) so as to be positioned diagonally to the front of the driver D. The third position detecting sensor 8c is attached to the interior of roof R, which is a left side of the front seat F. Ultrasonic waves sent from sensor heads (not shown) of the respective position detecting sensors 8a to 8c are reflected from the head D1 of the driver D. The position detecting sensors 8a to 8c measure the time interval between the sending of an ultrasonic wave and the receiving of a reflected wave, and based on the measured time, each calculates a respective relative distance to the head D1. The calculated respective relative distances are output to the control portion 10 via the sensor I/F portion 23. Alternatively, the relative distances to the head D1 may be calculated by the sensor I/F portion 23 based on signals from the respective position detecting sensors 8a to 8c.

While the driver D is seated in the driver seat, the control portion 10 uses triangulation or like method to calculate a head position, i.e., a head center position Dc, based on a range of head movement through which the head D1 of a driver D of standard build is capable of moving and based on the respective relative distances detected by the first to third position detecting sensors 8a to 8c.

Referring to FIG. 1 again, the driving support unit 2 includes an image data input portion (section) 22, as well as an image processor 20 that serves as a virtual plane setting mechanism (means), an image plane setting mechanism (means), an image processing mechanism (means), and an output control mechanism (means). Under control of the control portion 10, the image data input portion 22 drives the camera 6 provided in the vehicle C and receives image data IM from the camera 6.

Figure 3:
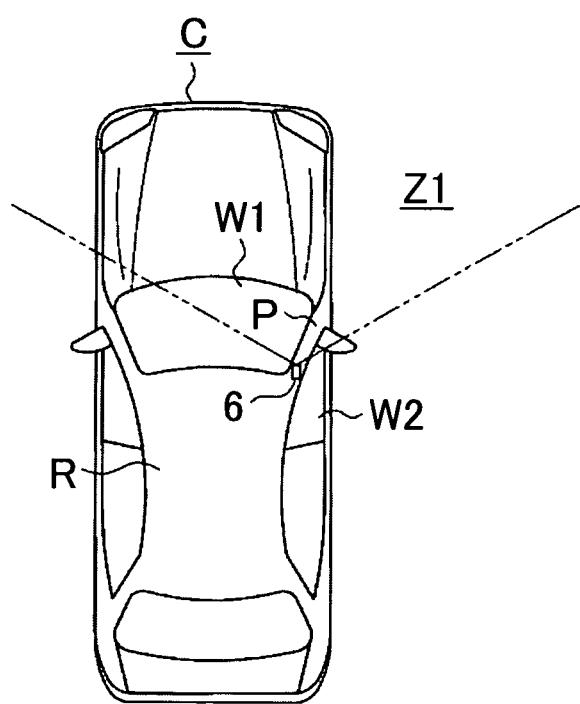
FIG. 3 is a drawing showing the mounting location of a camera.

The camera 6 is a camera that takes (captures) a color image. The camera 6 includes: an optical mechanism including a lens, a mirror, and the like; a CCD imaging element (neither of which is shown); and an automatic focusing mechanism. As FIG. 3 shows, the camera 6 is attached to an outer side of a front pillar P (hereinafter referred to simply as "pillar P") of the vehicle C, such that its optical axis faces to the front of the vehicle C. In the present embodiment, the camera 6 is aligned with the driver seat disposed on the vehicle right side and is attached to the pillar P on the right side of the driver seat. The camera 6 images the background of an imaging area Z1 at the front-right side of the vehicle C and a portion at the right side of the vehicle C.

The image processor 20 of the driving support unit 2 obtains the image data IM from the camera 6 via the image data input portion 22. The image processor 20 isolates an area blocked by the pillar P from among the obtained image data IM and performs image processing to eliminate image distortion.

Figure 4:
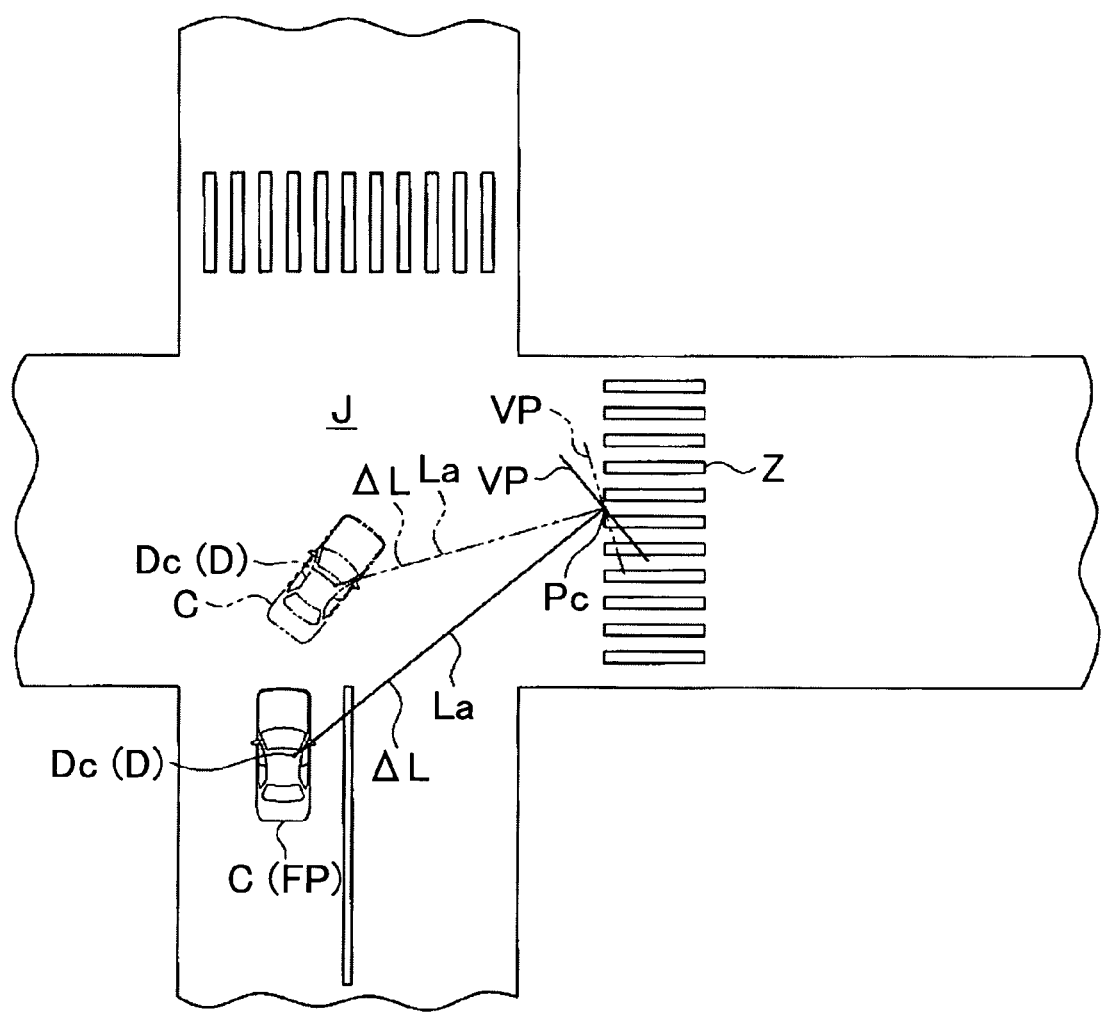
FIG. 4 is a drawing explaining the setting of the position of a virtual plane.

More specifically, if the control portion 10 determines that the vehicle C has reached an intersection or a curve, based on the route data 16, then it signals the image processor 20 to obtain coordinates for a visible target object that is easy for the driver D to watch at the intersection or curve. In the present embodiment, the image processor 20 obtains coordinates for a depicted reference object, i.e., a crosswalk Z, based on the map depiction data 17. For example, as shown in FIG. 4, coordinates for a reference point Pc of the crosswalk Z to the front of the vehicle are obtained based on the map depiction data 17. The reference point Pc is either stored in advance in the map depiction data 17 or set by the image processor 20 from the coordinates of the entire crosswalk Z stored in the map depiction data 17.

Figure 5:
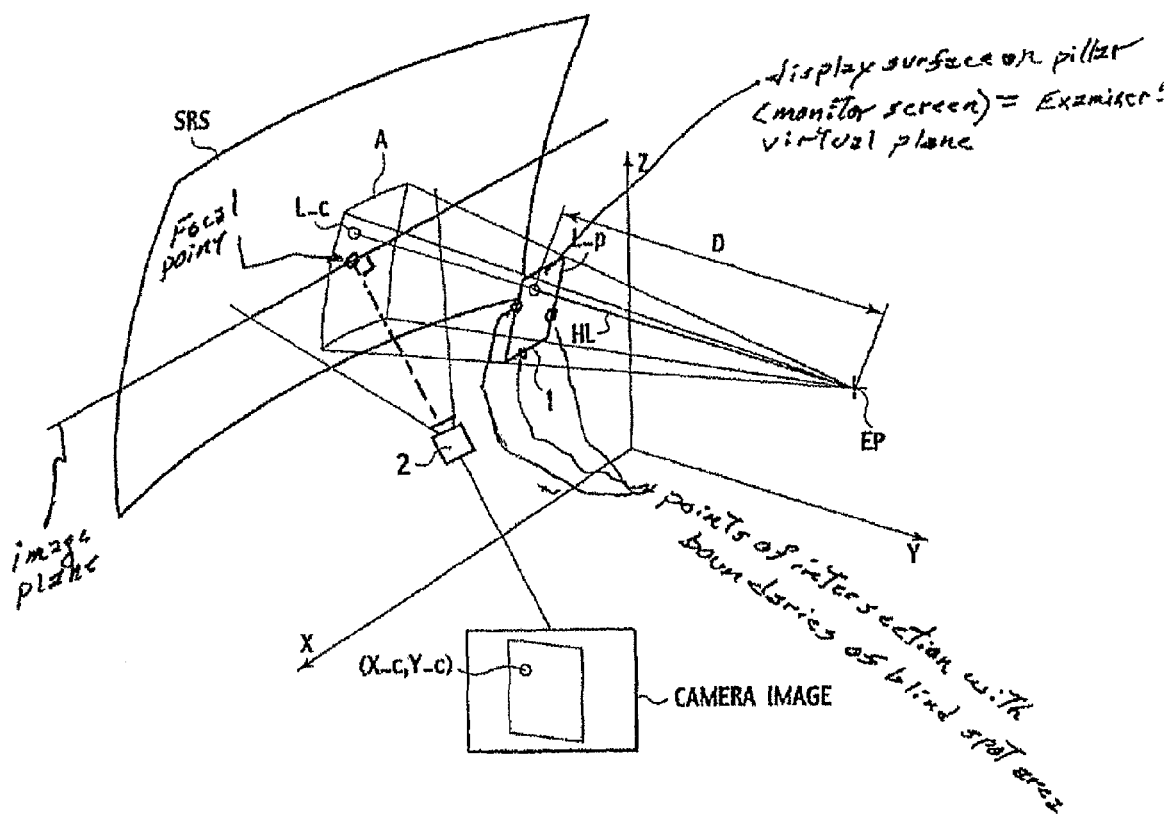
FIG. 5 is a drawing showing a virtual plane and a camera image plane.

Once the coordinates of the reference point Pc are obtained, the position of a virtual plane VP is determined based on the coordinates of the reference point Pc and the head center position Dc of the driver D, which was detected by the first to third position detecting sensors 8a to 8c. The virtual plane VP is a plane onto which an image taken by the camera 6 is projected. Furthermore, an object on which the virtual plane VP is set is selected to enable display without offsetting or skewing when the image data IM from the camera 6 is transformed into coordinates on the virtual plane VP. As FIG. 5 shows, the image processor 20 positions the virtual plane VP to pass through the reference point Pc and to be perpendicular to the center line La linking the head center position Dc and the reference point Pc. The image processor 20 also locates the virtual plane VP inside a blind spot area A, which is defined between tangent lines L1, L2 which pass through end points P1, P2 of the pillar P from the head center position Dc of the driver D. These tangent lines L1, L2 are the boundaries of the blind spot area A.

As shown in FIG. 4, as the vehicle C moves from a first position FP at which the virtual plane VP was first set to a position indicated by a two-dot broken line in the figure, the relative distance ΔL between the head center position Dc and the reference point Pc on the crosswalk Z is changed. However, the image processor 20 continues to set the virtual plane VP at a position that passes through the reference point Pc and is perpendicular to the center line La. In other words, the virtual plane VP is not moved with the forward travel of the vehicle C and always remains set in a position that passes through the reference point Pc. As shown in FIG. 4, turning of the vehicle changes the slope of the center line La linking the head center position Dc and the reference point Pc, and such a change is accompanied only by a change in the angle of the virtual plane VP.

In addition, the image processor 20 determines an image plane CP in accordance with the position of the virtual plane VP. The image plane CP indicates the focal point of the camera 6 and is represented by a plane perpendicular to the optical axis AX of the camera 6. As FIG. 5 shows, the image processor 20 sets the image plane CP at a position (a predetermined position) that is closer to the vehicle C than the virtual plane VP and that intersects a left end point VP1 or a right end point VP2 of the virtual plane VP defined by the blind spot area A. Here, the head center position Dc of the driver D is used as a reference to set the image plane CP at a position close to the head center position Dc. Also note that the respective end points VP1, VP2 are points of intersection between the virtual plane VP and the tangent lines L1, L2, respectively linking the head center position Dc with the end points P1, P2 of the pillar P.

More specifically, in the method for setting the image plane CP, first, the image processor 20 compares the orientation of the optical axis AX of the camera 6 and the orientation of the center line La linking the head center position Dc and the reference point Pc. Namely, the angle θc between the optical axis AX and the horizontal (Y-direction) and an angle θd formed by the center line La and the horizontal (Y-direction) are calculated. Then, the angle θc the angle θd are compared. It should be noted that the X-direction is a direction parallel to the length of the vehicle C, and that the Y-direction is a direction perpendicular to the X-direction, i.e., a direction parallel to the vehicle width.

As FIG. 5 shows, if the angle θc of the optical axis AX is larger than the angle θd of the center line La (θc>θd), then the image plane CP must be set to a position that passes through the right end point VP2 in order to set the image plane CP at a position that meets the above conditions. Conversely, setting the image plane CP at a position that passes through the left end point VP1 would result in setting the image plane CP at a position farther from the head center position Dc than the virtual plane VP. Therefore, the image processor 20 sets the image plane CP at a position that passes through the right end point VP2 of the virtual plane VP.

Figure 6:
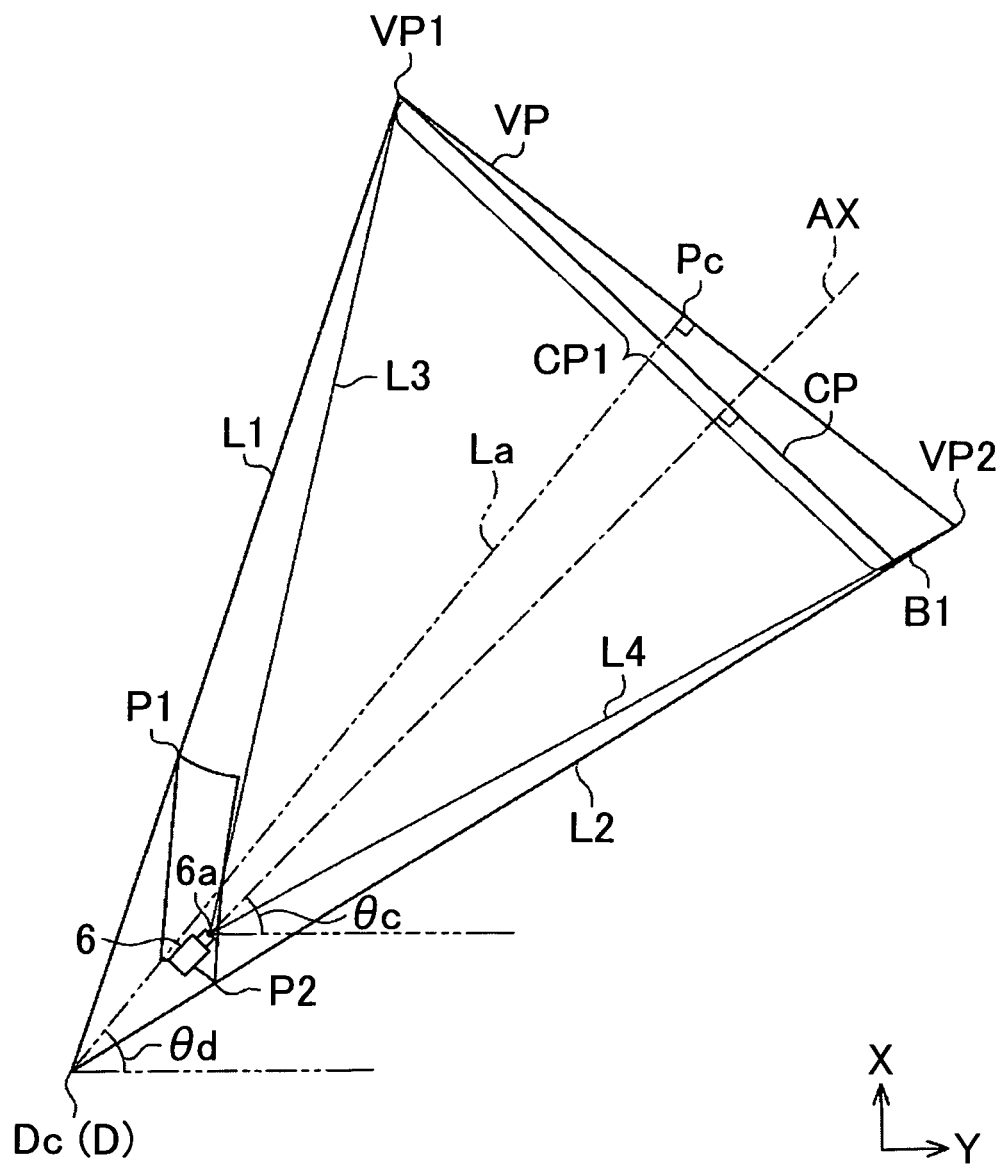
FIG. 6 is another drawing of a virtual plane and a camera image plane.

As FIG. 6 shows, if the angle θc of the optical axis AX is smaller than the angle θd of the center line La (θc<θd), then the image processor 20 sets the image plane CP at a position that passes through the left end point VP1 of the virtual plane VP.

If the angle θc of the optical axis AX is equal to the angle θd of the center line La, i.e., if the optical axis AX and the center line La overlap, then the image plane CP and the virtual plane VP can be overlapped. Therefore, the image plane CP is set to coincide with the virtual plane VP.

Once the image plane CP is set, the image processor 20 obtains the image data IM that was taken with the focal point of the camera 6 on the image plane CP, via the image data input portion 22.

After the image data IM is obtained, a projection portion CP1 of the image data IM, to be projected on the virtual plane VP, is trimmed (isolated) to generate pillar blind spot data BD. More specifically, as FIG. 5 shows, the image processor 20 trims the CP to obtain the projection portion CP1 between respective linear lines L3, L4 linking the camera position 6a and the end points VP1, VP2. Image data for the trimmed projection portion CP1 becomes the pillar blind spot data BD.

Once the pillar blind spot data BD is obtained, the image processor 20 performs projection transformation of the pillar blind spot data BD onto the virtual plane VP. Such projection transformation is processing that transforms the coordinates of pixels of the projection portion CP1 into coordinates for pixels on the virtual plane VP.

In addition, the image processor 20 transforms the image, which was transformed and projected on the virtual plane VP, for projection onto the interior surface Pa of the pillar P. The pillar surface can be set based on three-dimensional coordinates of a pillar shape 41 (see FIG. 1) stored in the ROM 12. It should be noted that the pillar shape 41 is data for the outer shape of the pillar P using a pattern or coordinates, and such data differs depending on the vehicle model. The image processor 20, based on the pillar shape 41, can obtain three-dimensional coordinates for the dimensions parallel to the vehicle length, vehicle width, and the vertical, which together define the outer shape of the pillar P. Furthermore, the width and length of the pillar P can also be obtained as data using three-dimensional coordinates.

Next in order for the projector 4 to project the image onto the pillar surface in line with the position and shape of the pillar P, the coordinates of the image are transformed to align with the position of the projector 4. Otherwise, the image displayed on the interior surface Pa would be distorted, enlarged, or reduced depending on the angle of incidence of light output from the projector 4 onto the interior surface Pa of the pillar P. Accordingly, for example, a map correlating the coordinates of the pixels of the image subject to projection transformation and the coordinates of the pixels of the image output to the projector 4 is stored in advance in the main memory 11 or the like. Based on such a map, the image subjected to projection transformation is further subjected to coordinate transformation to generate projection data PD which is then output to the projector 4.

Figure 7:
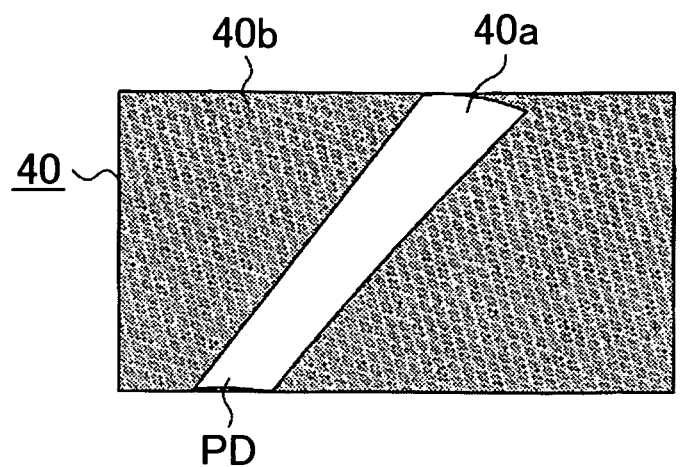
FIG. 7 is drawing of a mask pattern.

In addition, the image processor 20 generates an image signal from the projection data PD for output to the projector 4, based on a mask pattern 40 (see FIGS. 1 and 7) stored in the ROM 12. Referring to FIG. 7, the mask pattern 40 is data for applying a mask to the projection data PD, and includes an image display area 40*a* corresponding to the interior surface of the pillar P, and a mask 40*b*. The image processor 20 reads the projection data PD in the region of the image display area 40*a*, and generates output data OD so that the projector 4 does not display the region of the mask 40*b*, which data OD is then output to the projector 4.

Figure 8:
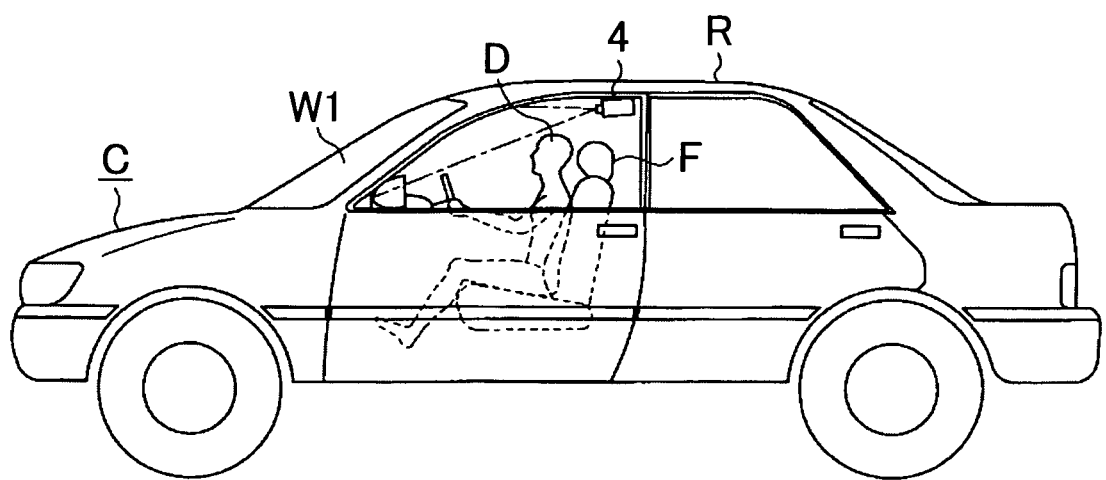
FIG. 8 is a side view of a vehicle showing the mounting location of a projector.
Figure 9:
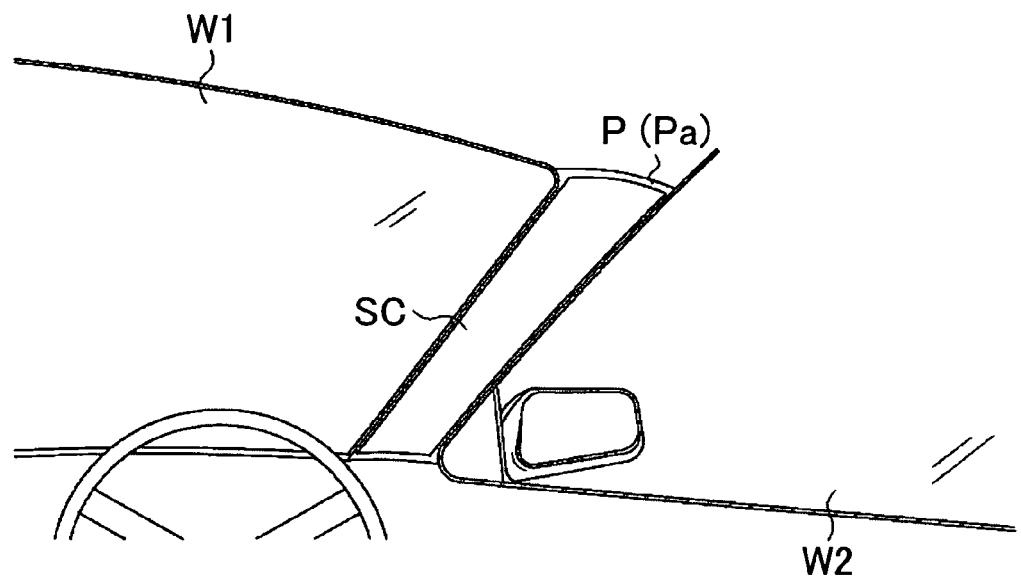
FIG. 9 is a frontal view showing a pillar inner surface onto which an image is projected.

The projector 4, as FIG. 8 shows, is attached to the interior of the roof R approximately vertically above of the front seat F where the driver D sits, where it is capable of projecting an image onto the interior surface of the pillar P on the right side of the vehicle C. Referring to FIG. 9, a screen SC that is cut to fit the shape of the pillar P is applied to the interior surface Pa of the pillar P. The focal point of the projector 4 is adjusted to align with the screen SC. It should also be noted that the screen SC may be omitted in cases where the inner side surface Pa of the pillar P is formed of a material and shape enabling the reception of projected light from the projector 4, as well as the display of a sharp image.

Figure 10:
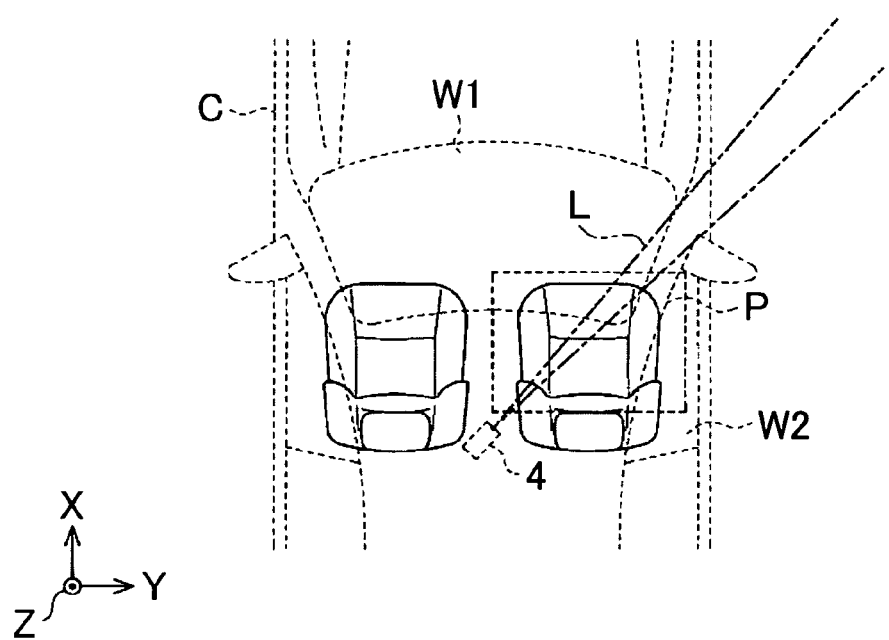
FIG. 10 is a plan view showing direction of projection by of the projector.

As FIG. 10 shows, the projector 4 projects light L onto the screen SC of the pillar P. No image is projected onto the front windshield W1 or door window W2, adjacent the screen SC, due to the mask 40*b*.

Figure 11:
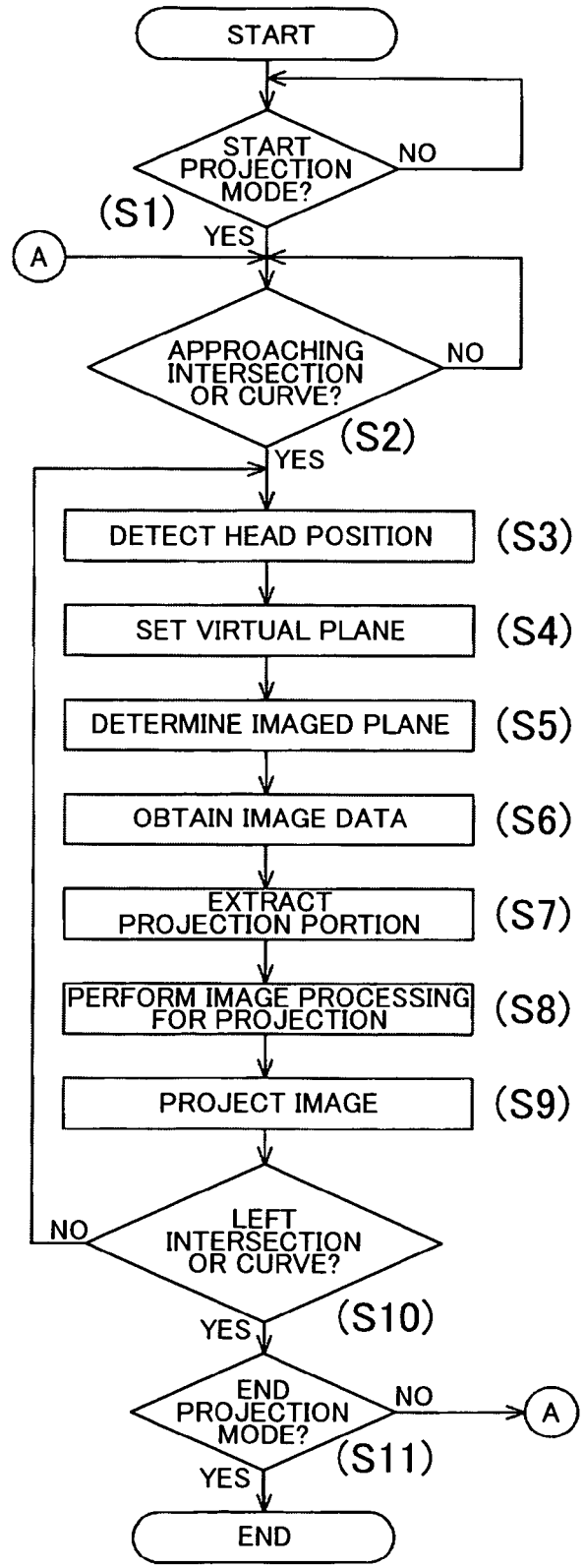
FIG. 11 is a flowchart of a embodiment of the method of the present invention.
Figure 13:
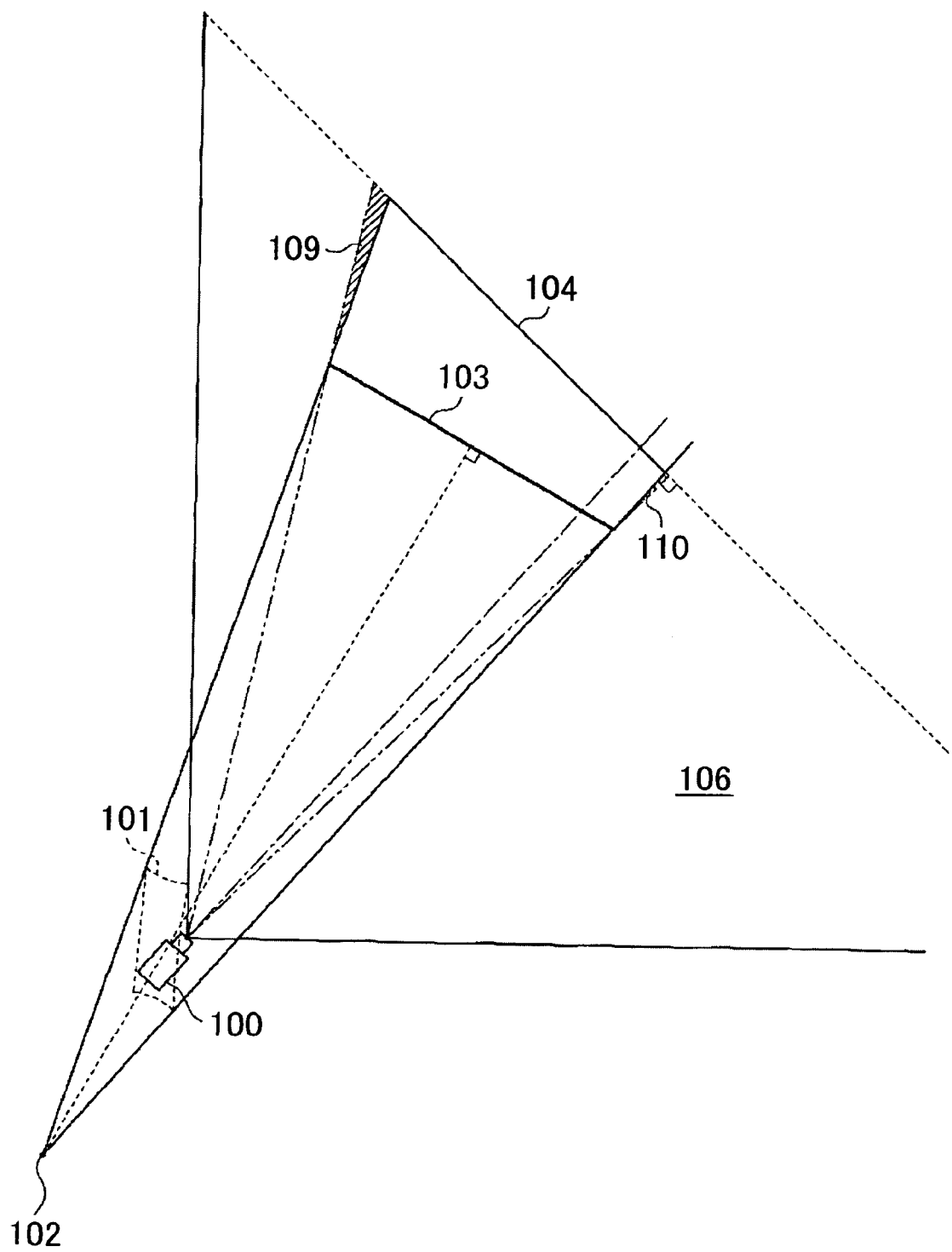
FIG. 13 is a drawing of another conventional arrangement of a camera image plane and a virtual plane.

The method of the present embodiment will be explained next with reference to FIG. 11. First, the control portion 10 of the driving support unit 2 waits for a start signal for projection of a background image onto the interior surface of the pillar P (step S1). For example, the start signal for projection is generated by input through a touch panel or operation of switch 26 and the control portion 10 receives a projection start request via the external input I/F portion 25. Alternatively, the start of the projection mode may be responsive to an ON signal from an ignition module (not shown).

If it is determined that the projection mode is to be started (YES at step S1), then the control portion 10 waits for the vehicle C to approach an intersection or a curve, based on the route data 16 (step S2). More specifically, if the control portion 10 determines that the vehicle C has advanced to within a predetermined distance (e.g. 200 meters) from an intersection (including a T-road or a curve of at least a predetermined curvature), then the control portion 10 determines that the vehicle C has approached the intersection or curve.

If it is determined that the vehicle C has approached an intersection or curve (YES at step S2), then the control portion 10 uses the respective position detecting sensors 8*a* to 8*c* to detect the head position of the driver D (step S3). At this time, the control portion 10 obtains the respective relative distances from the position detecting sensors 8*a* to 8*c* to the head portion D1, via the sensor I/F portion 23. Then, using the respective relative distances, the control portion 10 identifies the head center position Dc based on triangulation.

Once the head center position Dc has been calculated, the image processor 20 sets the virtual plane VP, as described above (step S4). When the vehicle C approaches an intersection J (see FIG. 4), then the reference point Pc of the crosswalk Z is obtained based on the map depiction data 17, and the virtual plane VP is set at a position that passes through the reference point Pc. If there is no crosswalk Z, then a road marking such as a stop line in front of the vehicle may be used. When the vehicle C is approaching a curve, the reference point Pc may be the location of maximum curvature of the center line of the road.

In addition, the image processor 20 sets the image plane CP (step S5). At this time, as described above, the image processor 20 compares the angle θc of the optical axis AX of the camera 6 and the angle θd of the center line La linking the head center position Dc and the reference point Pc. As FIG. 5 shows, if the angle θc of the optical axis AX is larger than the angle θd of the center line La (θc<θd), then the image processor 20 sets the image plane CP at a position in front of the virtual plane VP that passes through the right end point VP2 of the virtual plane VP. At this time, as shown in FIG. 5, by separation of the left end point VP1 and the image plane CP, a non-displayable area B1 is created in the blind spot area A blocked by the pillar P, which cannot be projected on the pillar P. Although the non-displayed area B1 is a narrow region, when an image is displayable on the pillar P, the continuity is somewhat disrupted between the image displayed on the pillar P and the actual background visible through the windows W1, W2. Therefore, the right end point VP2 is intersected by the image plane CP so that another non-displayable area B1 is not created and better continuity of the image is achieved, as compared to when two non-displayable areas B1 are created at the respective ends.

Moreover, since the image plane CP is set to a position that is closer to the head center position Dc of the driver D than the virtual plane VP, excess area of the image taken aligned with the focal point is not projected onto the pillar P.

Also, as FIG. 6 shows, if the angle θc of the optical axis AX is smaller than the angle θd of the center line La (θc<θd), then the image processor 20 sets the image plane CP at a position that passes through the left end point VP1 of the virtual plane VP and, therefore, no non-displayable area B1 is created at the left end point VP1.

After the image plane CP is set, based on the image plane CP set by the image processor 20, the camera 6 aligns the focal point with the image plane CP for imaging to obtain the image data IM (step S6).

Once the image processor 20 obtains the image data IM, as described above, the projection portion CP1 to be projected on the virtual plane VP is extracted from among the image data IM (step S7) and the pillar blind spot data BD is generated.

Following generation of the pillar blind spot data BD, the image processor 20 executes image processing to project the pillar blind spot data BD (step S8). More specifically, as described above, the pillar blind spot data BD is transformed for projection on the virtual plane VP set in step S4. The image subjected to projection transformation on the virtual plane VP undergoes further transformation to fit the three-dimensional shape of the pillar P, based on the pillar shape 41. The image transformed to fit the three-dimensional shape of the pillar P is then subjected to coordinate transformation, based on the position of the projector 4, to generate the projection data PD. Additionally, based on the projection data PD and the mask pattern 40, the output data OD, with regions other than the pillar P masked out, is generated.

Once the output data OD is generated, the image processor 20 outputs it to the projector 4. The projector 4, as FIG. 10 shows, projects the image of the region blocked by the pillar P onto the screen SC, which is provided on the interior surface Pa of the pillar P (step S9). The projected image displayed on the screen SC undergoes projection transformation onto the virtual plane VP in line with a road marking such as the crosswalk Z in advance. Therefore, the road marking is displayed without offset or skewing relative to the background visible through the front windshield W1 and the door window W2. Furthermore, by positioning the image plane CP to intersect either of the end points VP1, VP2 of the virtual plane VP, it is possible to reduce the non-displayable area B1 and the excess area generated by offset between the virtual plane VP and the imaged plane CP, thereby improving continuity with the background visible through the windows W1, W2.

After the image is projected on to the pillar P, the control portion 10 determines whether the vehicle C has left the intersection J or the curve (step S10). If it is determined that the vehicle C is still near the intersection J or inside the curve (NO at step S10), then the control portion 10 returns to step S3 and repeats the steps from head position detection (step S3) to image projection (step S9). In other words, the image blocked by the pillar P is projected onto the pillar P until the vehicle C leaves the intersection J or the curve.

If it is determined that the vehicle C has left the intersection J or the curve (YES at step S10), then the control portion 10 determines whether to end the projection mode (step S11). An end trigger (signal) is generated by operation of the touch panel or the switch 26, or an OFF signal from the ignition module. Following input of an end signal, the control portion (controller) 10 terminates execution of the projection mode (YES at step S11).

The above embodiment offers the following advantages.

(1) In the above embodiment, the image processor 20 sets the virtual plane VP at a position that passes through the reference point Pc of a targeted object, e.g. a road marking, when the vehicle C approaches an intersection or curve. In addition, the image plane CP from the camera 6 is set at a position which is in front of the virtual plane VP and which passes through at least one of the end points VP1, VP2 of the virtual plane VP. Thus, it is possible to reduce the non-displayable area B1, i.e. that portion of the blind spot area A which cannot be projected onto the pillar P, and possible to reduce the excess area of the image aligned on the focal point that cannot be projected onto the pillar P. As a consequence, a normal looking image can be displayed on the pillar P with excellent continuity with the actual background visible through the respective windows W1, W2.

(2) In the above embodiment, the angle $\theta c$ formed by the optical axis AX of the camera 6 and the horizontal direction is compared with the angle $\theta d$ formed by the line from the head center position Dc to reference point Pc in the blind spot area A and the horizontal. If the angle $\theta c$ is larger than the angle $\theta d$, then the image plane CP is set at a position that passes through the right end point VP2. Meanwhile, if the angle $\theta c$ is smaller than the angle $\theta d$, then the image plane CP is set at a position that passes through the left end point VP1. As a consequence, the image plane CP is always set in front of the virtual plane VP. Therefore, it is possible to reduce the excess area which would be created by setting the image plane CP at a position farther away from the head center position Dc than the virtual plane VP.

The above embodiment may be modified, for example, in any of the following respects.

In the above embodiment, the reference point Pc of the road marking is set based on the map depiction data 17. However, white line recognition processing may be applied to the image data IM obtained from the camera 6 to detect a white line (or yellow line) on the road surface. The reference point Pc may then be set at the end or center of the detected white line.

In the above embodiment, the virtual plane VP is aligned on a road marking such as the crosswalk Z. However, the targeted object with which the virtual plane VP is aligned may be changed as appropriate. For example, the virtual plane VP may be aligned with an object installed near or over the road, such as a traffic signal. As another example, the virtual plane VP may be aligned with an obstacle or hazard such as a detected pedestrian or bicycle. Such detection may be by radar or the like mounted on the vehicle C, which serves as an obstacle detecting mechanism that determines a relative distance to a forward obstacle. It should be noted that known image processing, such as feature detection, can be used to determine whether the obstacle is a pedestrian or bicycle, for example.

Data indicating the position of a road marking such as a crosswalk may be obtained from a server that distributes such data or from road-to-vehicle communication or vehicle-to-vehicle communication. Furthermore, data indicating the position of obstacles such as pedestrians may be received from an external device in another vehicle, for example.

In the above embodiment, the sound processor 24 may be omitted if voice guidance is not used.

In the above embodiment, an image is projected onto the interior surface Pa of the pillar P by the projector 4. However, a display in the form of a thin display may be provided on the inner side of the pillar P, and the output data OD may be output directly to the display from the image processor 20.

In the above embodiment, the camera 6 is provided on an outer side of the front pillar P to image an area blocked by the front pillar P. However, the camera 6 may be provided on another pillar, such as one toward the side or back of the vehicle. For example, the camera 6 may be attached to an outer side of a rear pillar toward the back of the vehicle and used to image an area blocked by the rear pillar. In such a case, the projector 4 is positioned to project an image onto the interior surface of the rear pillar, and the image processor 20 projects an image of a blind spot area blocked by the rear pillar onto that interior surface of the rear pillar, based on image data from the camera 6. Thus, when the vehicle C is backing into a parking space, for example, the driver can use the projected image to check that portion of his/her view of parking space which is blocked by the rear pillar, thereby facilitating the parking operation. In addition, a plurality of cameras 6 may be respectively provided on the exterior of each of a plurality of pillars P, and a plurality of projectors 4 may be provided in accordance with the positions of the cameras 6. Furthermore, a plurality of cameras 6 may also be provided on a single pillar P.

In the above embodiment, the projector 4 is provided on the interior of the roof R of the vehicle C. However, the position of the projector 4 is arbitrary, provided that it is a position at which the projector 4 can project an image onto the interior surface of the pillar P. For example, the projector 4 may be provided (generally centered) on top of a dashboard or at another position.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving support method for a vehicle:
imaging a blind spot area created by a pillar of a vehicle using an imaging device mounted on the vehicle;
setting a virtual plane that intersects boundaries of the blind spot area, thereby defining two intersection points, wherein the virtual plane is perpendicular to a linear line linking a head position of the driver of the vehicle to a position of a reference object which is in advance of the vehicle, and wherein the virtual plane passes through the position of the reference object;

setting an image plane of the imaging device in a position passing through at least one of the intersection points and through a focal point of the imaging device, wherein the image plane of the imaging device is set at a position closer to the vehicle than the virtual plane;

obtaining, from the imaging device, image data for the image plane and subjecting the obtained image data to coordinate transformation on the virtual plane; and displaying an image corresponding to the blind spot on an interior surface of the pillar based on the image data subjected to coordinate transformation on the virtual plane.

2. A driving support device that receives image data from an imaging device mounted on a vehicle for imaging a blind spot area created by a pillar of the vehicle, the driving support device comprising:

virtual plane setting means for setting a virtual plane that intersects boundaries of the blind spot area, thereby defining two intersection points, wherein the virtual plane is perpendicular to a linear line linking a head position of the driver of the vehicle to a position of a reference object which is in advance of the vehicle, and wherein the virtual plane passes through the position of the reference object;

image plane setting means for setting an image plane for the imaging device at a position that passes through at least one of the two intersection points of the virtual plane and through a focal point of the imaging device, wherein the image plane setting means sets the image plane of the imaging device at a position closer to the vehicle than the virtual plane;

image processing means for obtaining image data for the image plane and for subjecting the obtained image data to coordinate transformation on the virtual plane; and output control means for displaying an image of the blind spot created by the pillar on the interior surface of the pillar, based on the image data which has been subjected to coordinate transformation on the virtual plane.

3. The driving support device according to claim 1, wherein:

the reference object is on a road surface in the vicinity of the vehicle and is depicted in the image data, and the image plane setting means selects one of the two intersection points of the virtual plane, based on an orientation of an optical axis of the imaging device and an orientation of the linear line linking the head position of the driver of the vehicle and the position of the reference object.

4. A driving support device that receives image data from an imaging device mounted on a vehicle for imaging a blind spot area created by a pillar of the vehicle, the driving support device comprising:

virtual plane setting means for setting a virtual plane that intersects boundaries of the blind spot area, thereby defining two intersection points, wherein the virtual plane is perpendicular to a linear line linking a head position of the driver of the vehicle to a position of a reference object which is in advance of the vehicle, and wherein the virtual plane passes through the position of the reference object;

image plane setting means for setting an image plane for the imaging device at a position that passes through at least one of the two intersection points of the virtual plane and through a focal point of the imaging device;

image processing means for obtaining image data for the image plane and for subjecting the obtained image data to coordinate transformation on the virtual plane; and output control means for displaying an image of the blind spot created by the pillar on the interior surface of the pillar, based on the image data which has been subjected to coordinate transformation on the virtual plane, wherein:

the reference object is on a road surface in the vicinity of the vehicle and is depicted in the image data, and the image plane setting means selects one of the two intersection points of the virtual plane, based on an orientation of an optical axis of the imaging device and an orientation of the linear line linking head position of a driver of the vehicle and the position of the reference object.

5. A driving support method for a vehicle:

imaging a blind spot area created by a pillar of a vehicle using an imaging device mounted on the vehicle;

setting a virtual plane that intersects boundaries of the blind spot area, thereby defining two intersection points, wherein the virtual plane is perpendicular to a linear line linking a head position of the driver of the vehicle to a position of a reference object which is in advance of the vehicle, and wherein the virtual plane passes through the position of the reference object;

setting an image plane of the imaging device in a position passing through at least one of the intersection points and through a focal point of the imaging device;

obtaining, from the imaging device, image data for the image plane and subjecting the obtained image data to coordinate transformation on the virtual plane; and displaying an image corresponding to the blind spot on an interior surface of the pillar based on the image data subjected to coordinate transformation on the virtual plane;

the reference object which is on a road surface in the vicinity of the vehicle and which is depicted in the image data, and the image plane setting means selects one of the two intersection points of the virtual plane, based on an orientation of an optical axis of the imaging device and an orientation of the linear line linking head position of a driver of the vehicle and the position of the reference object, wherein:

the reference object is on a road surface in the vicinity of the vehicle and is depicted in the image data, and the image plane is set by selecting one of the two intersection points of the virtual plane, based on an orientation of an optical axis of the imaging device and an orientation of the linear line linking head position of a driver of the vehicle and the position of the reference object.

6. The driving support device according to claim 2, wherein:

the reference object is on a road surface in the vicinity of the vehicle and is depicted in the image data, and the image plane setting means selects one of the two intersection points of the virtual plane, based on an orientation of an optical axis of the imaging device and an orientation of the linear line linking the head position of the driver of the vehicle and the position of the reference object.

* * * * *